United States Patent
Stamps

(10) Patent No.: US 9,254,915 B2
(45) Date of Patent: Feb. 9, 2016

(54) ROTOR SYSTEM WITH TORQUE-SPLITTER ASSEMBLY

(71) Applicant: Bell Helicopter Textron Inc., Fort Worth, TX (US)

(72) Inventor: Frank B. Stamps, Collyeville, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 515 days.

(21) Appl. No.: 13/975,830

(22) Filed: Aug. 26, 2013

(65) Prior Publication Data

US 2015/0053814 A1    Feb. 26, 2015

(51) Int. Cl.
  *B64C 27/00* (2006.01)
  *B64C 27/41* (2006.01)
  *F16D 3/42* (2006.01)

(52) U.S. Cl.
  CPC .. *B64C 27/41* (2013.01); *F16D 3/42* (2013.01)

(58) Field of Classification Search
  CPC ........ B64C 27/12; B64C 27/14; B64C 27/41; F16D 3/42
  See application file for complete search history.

(56) References Cited

U.S. PATENT DOCUMENTS

| | | | |
|---|---|---|---|
| 6,695,254 B2 | 2/2004 | Zoppitelli et al. | |
| 6,712,313 B2 | 3/2004 | Zoppitelli et al. | |
| 8,038,539 B2 * | 10/2011 | Stamps et al. | 464/138 |
| 8,226,355 B2 | 7/2012 | Stamps et al. | |
| 8,303,208 B2 * | 11/2012 | Tully, Jr. | 403/359.5 |
| 8,336,815 B2 * | 12/2012 | Rauber et al. | 244/60 |

* cited by examiner

*Primary Examiner* — Philip J Bonzell
(74) *Attorney, Agent, or Firm* — Christopher S. Storm; Bell Helicopter Textron Inc.

(57) ABSTRACT

According to one embodiment, a rotor head includes a yoke, a torque-splitter assembly, and a joint assembly. The torque-splitter assembly includes a spine assembly, a first trunion, and a second trunion. The spline assembly is configured to receive the drive shaft through a first opening. The spline assembly has a first plurality of outer splines oriented in a first direction and a second plurality of outer splines oriented in a second direction different from the first direction. The first trunion is disposed about the first plurality of outer splines. The second trunion is disposed about the second plurality of outer splines.

20 Claims, 11 Drawing Sheets

ROTOR SYSTEM WITH TORQUE-SPLITTER ASSEMBLY

TECHNICAL FIELD

This invention relates generally to rotor systems, and more particularly, to a rotor system with a torque-splitter assembly.

BACKGROUND

A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system.

SUMMARY

Particular embodiments of the present disclosure may provide one or more technical advantages. A technical advantage of one embodiment may include the capability to reduce or eliminate kinematic binding in a constant velocity joint. A technical advantage of one embodiment may also include the capability to improve torque transfer from a drive shaft to a rotor system. A technical advantage of one embodiment may include the capability to reduce the size and weight of various rotor head components.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Figure 1:
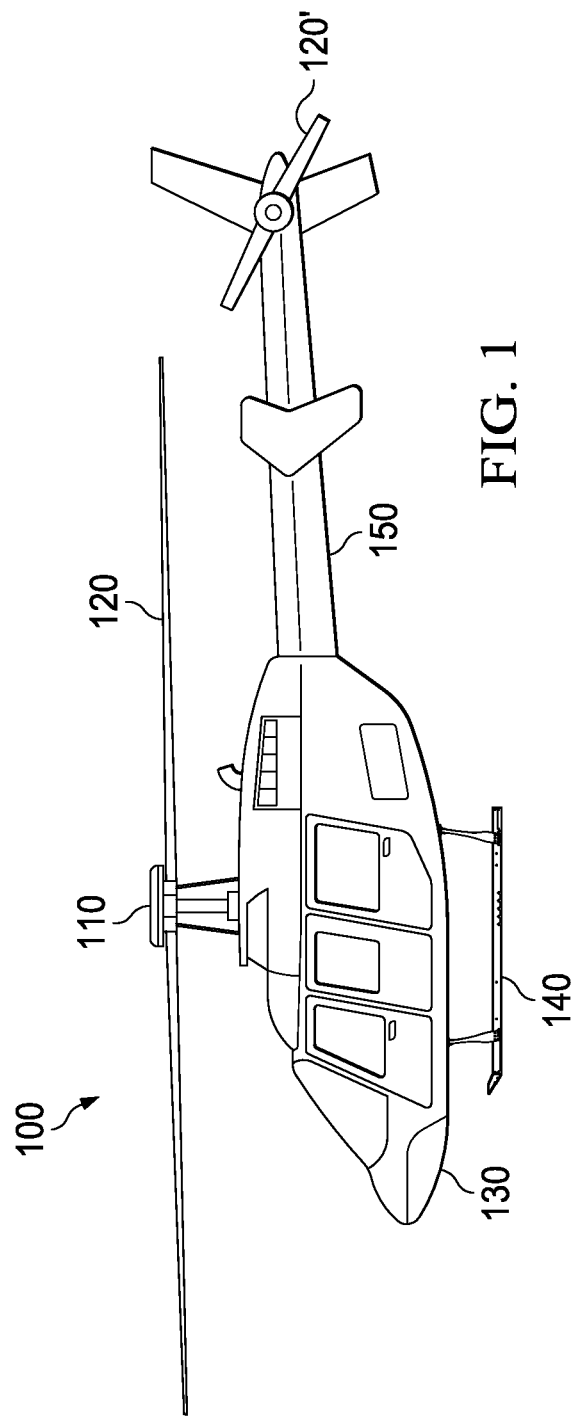
FIG. 1 shows a rotorcraft according to one example embodiment.

FIG. 1 shows a rotorcraft 100 according to one example embodiment. Rotorcraft 100 features a rotor system 110, blades 120, a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of rotorcraft 100. Fuselage 130 represents the body of rotorcraft 100 and may be coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' may provide thrust in the same direction as the rotation of blades 120 so as to counter the torque effect created by rotor system 110 and blades 120. Teachings of certain embodiments relating to rotor systems described herein may apply to rotor system 110 and/or other rotor systems, such as other tilt rotor and helicopter rotor systems. It should also be appreciated that teachings from rotorcraft 100 may apply to aircraft other than rotorcraft, such as airplanes and unmanned aircraft, to name a few examples.

Figure 2:
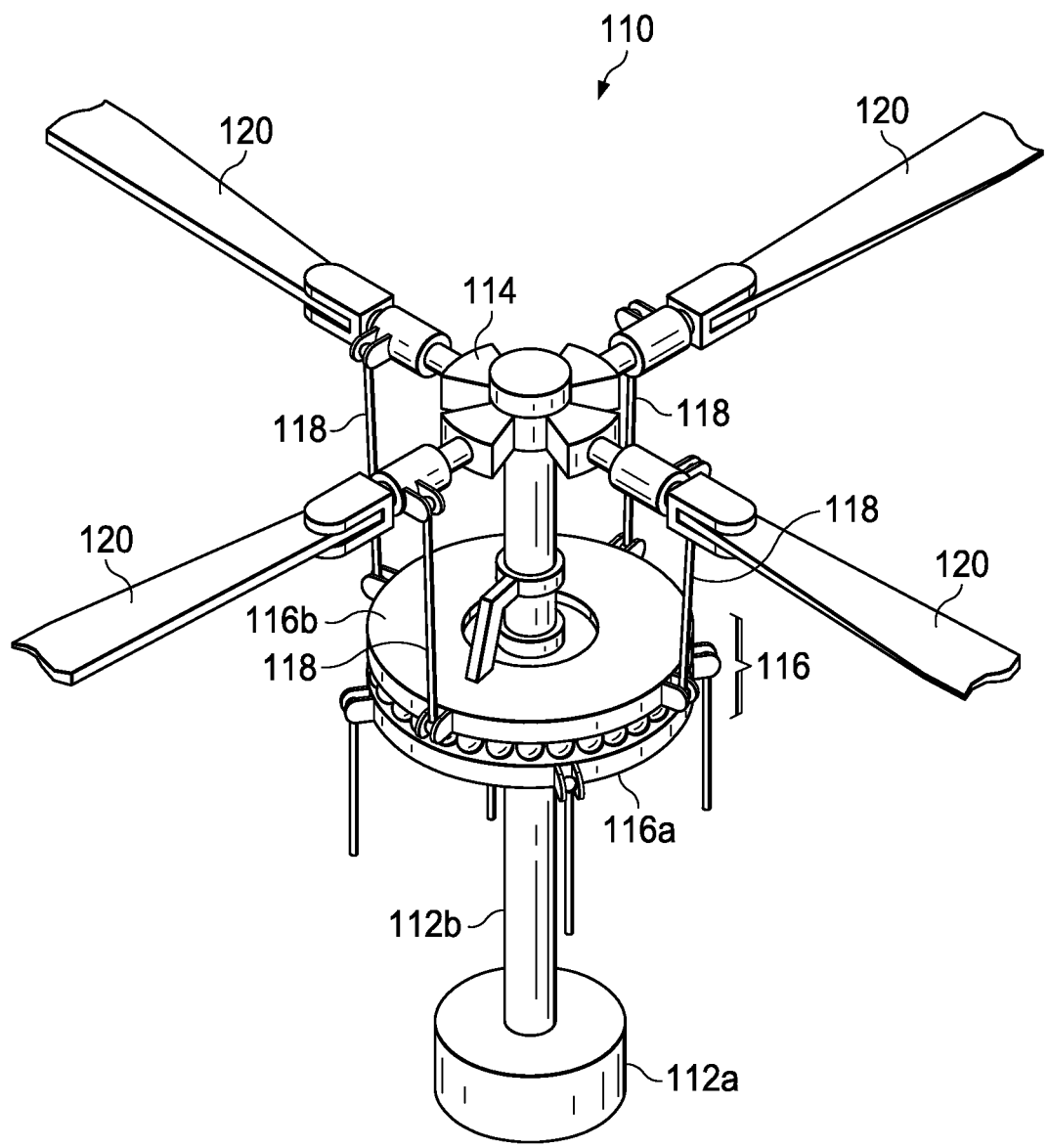
FIG. 2 shows a simplified view of the rotor system and blades of the rotorcraft of FIG. 1 according to one example embodiment.

FIG. 2 shows rotor system 110 and blades 120 of FIG. 1 according to one example embodiment. In the example of FIG. 2, rotor system 110 features a power train 112, a hub 114, a swashplate 116, and pitch links 118. In some examples, rotor system 110 may include more or fewer components. For example, FIG. 2 does not show components such as a gearbox, a swash plate, drive links, drive levers, and other components that may be incorporated.

Power train 112 features a power source 112a and a drive shaft 112b. Power source 112a, drive shaft 112b, and hub 114 are mechanical components for transmitting torque and/or rotation. Power train 112 may include a variety of components, including an engine, a transmission, and differentials. In operation, drive shaft 112b receives torque or rotational energy from power source 112a and rotates hub 114. Rotation of rotor hub 114 causes blades 120 to rotate about drive shaft 112b.

Swashplate 116 translates rotorcraft flight control input into motion of blades 120. Because blades 120 are typically spinning when the rotorcraft is in flight, swashplate 116 may transmit flight control input from the non-rotating fuselage to the hub 114, blades 120, and/or components coupling hub 114 to blades 120 (e.g., grips and pitch horns). References in this description to coupling between a pitch link and a hub may also include, but are not limited to, coupling between a pitch link and a blade or components coupling a hub to a blade.

In some examples, swashplate 116 may include a non-rotating swashplate ring 116a and a rotating swashplate ring 116b. Non-rotating swashplate ring 116a does not rotate with drive shaft 112b, whereas rotating swashplate ring 116b does rotate with drive shaft 112b. In the example of FIG. 2, pitch links 118 connect rotating swashplate ring 116b to blades 120.

In operation, according to one example embodiment, translating the non-rotating swashplate ring 116a along the axis of drive shaft 112b causes the pitch links 118 to move up or down. This changes the pitch angle of all blades 120 equally, increasing or decreasing the thrust of the rotor and causing the aircraft to ascend or descend. Tilting the non-rotating swashplate ring 116a causes the rotating swashplate 116b to tilt, moving the pitch links 118 up and down cyclically as they rotate with the drive shaft. This tilts the thrust vector of the rotor, causing rotorcraft 100 to translate horizontally following the direction the swashplate is tilted.

In the example of FIG. 2, hub 114 may be coupled to drive shaft 112b such that drive shaft 112b transmits torque to hub 114. Hub 114, however, may be moved in a variety of positions relative to drive shaft 112b. For example, pitch links 118 may move hub 114 relative to drive shaft 112b. Moving hub 114 relative to drive shaft 112b may change the angular relationship between hub 114 and drive shaft 112b, which may cause hub 114 and drive shaft 112b to phase shift. Hub 114 and drive shaft 112b may phase shift, for example, if they are not maintained at constant velocity during rotation. Accordingly, teachings of certain embodiments recognize that a constant-velocity (CV) joint may be provided between hub 114 and drive shaft 112b to allow drive shaft 112b to transmit power through a variable angle, at constant speed, without an appreciable increase in friction or play.

In general, a CV joint may refer to a type of mechanism that connects two rotating components making an angle with one another. This angle may vary during service, such as may be the case with the angle between hub 114 and drive shaft 112b. Teachings of certain embodiments recognize that a CV joint may mechanically couple an input shaft to an output shaft in such a way that torque may be transmitted from the input shaft to the output shaft whilst maintaining a substantially CV characteristic. A CV characteristic refers to a characteristic wherein the instantaneous angular velocity of the input shaft is substantially matched to the instantaneous angular velocity of the output shaft throughout a full rotation of the shafts. It is to be understood that the CV characteristic may represent a design goal, and various embodiments may achieve this characteristic to a greater or lesser degree based on parameters, which may include mechanical and structural variations in the assembly. Thus, a joint may maintain a substantially CV characteristic even if the angular velocities do not perfectly match. In some embodiments, a CV joint may maintain a substantially CV characteristic despite variations in angle between the input and output shafts.

Figure 3:
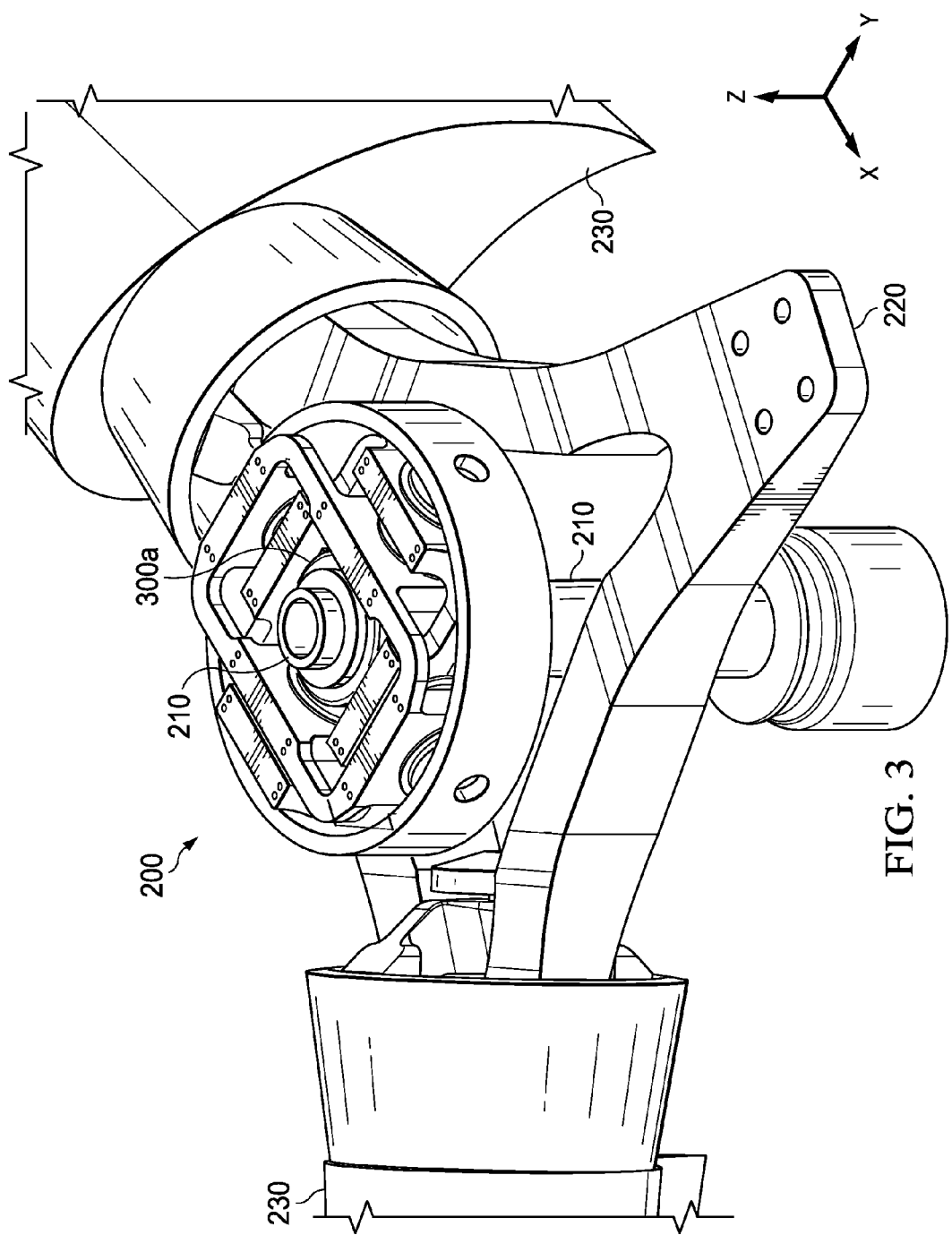
FIG. 3 shows an example rotor head that may be incorporated into a rotor system such as the rotor system of FIG. 2.

FIG. 3 shows a rotor head 200 according to one example embodiment. In the example of FIG. 3, rotor head 200 features a rotor mast 210, a yoke 220, a joint assembly 300a, and torque-splitter assembly 400. In some embodiments, joint assembly 300 may mechanically couple rotor mast 210 to yoke 220 via torque-splitter assembly 400 in such a way that torque may be transmitted from rotor mast 210 to yoke 220 whilst maintaining a substantially CV characteristic. Rotor mast 210 may be in mechanical communication with drive shaft 112b. In addition, hub 220 and blade portions 230 may correspond to the hub 114 and blades 120 of FIGS. 1 and 2.

Figure 4:
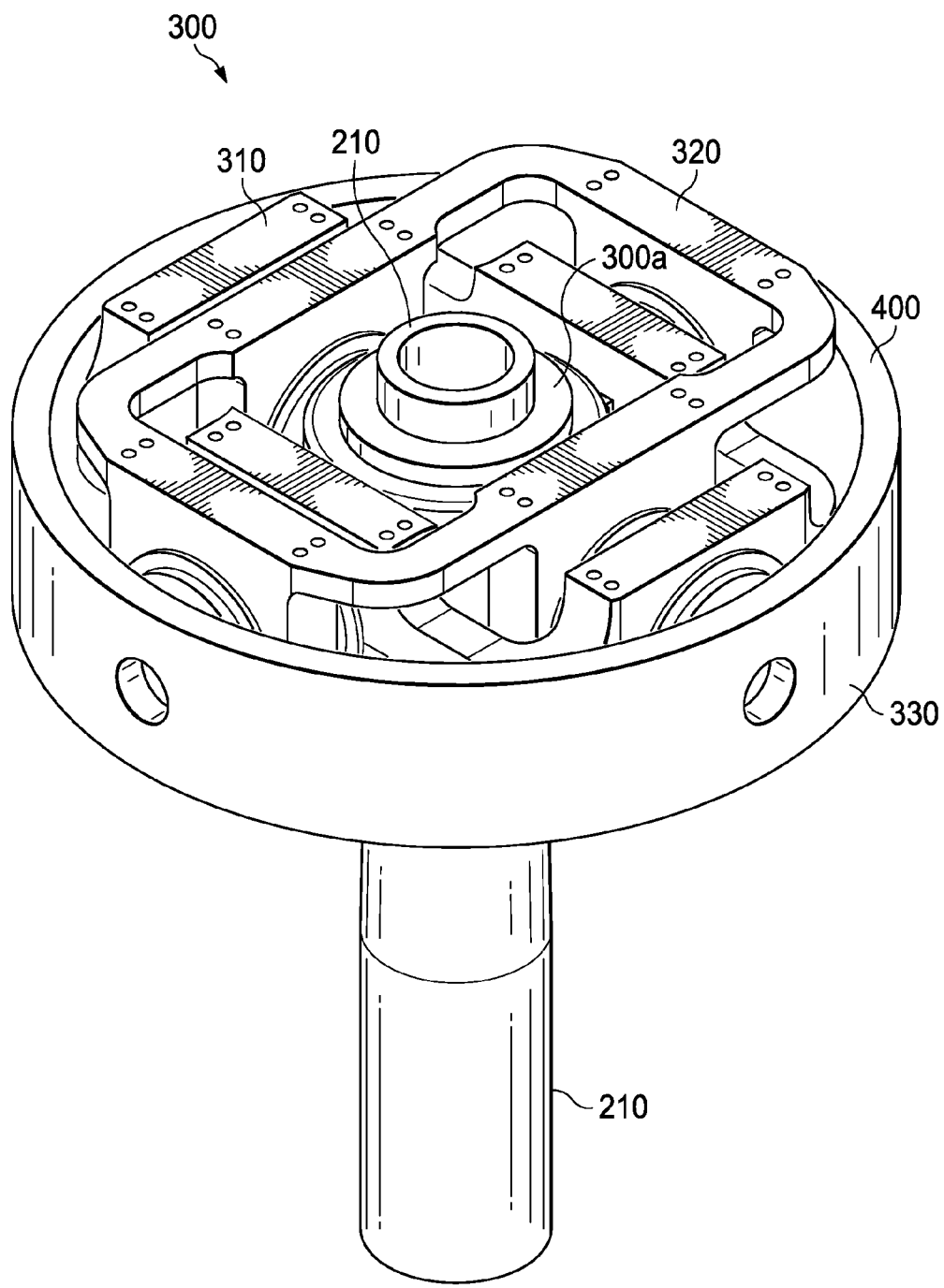
FIG. 4 shows a perspective view of the joint assembly of the rotor head of FIG. 3.
Figure 5:
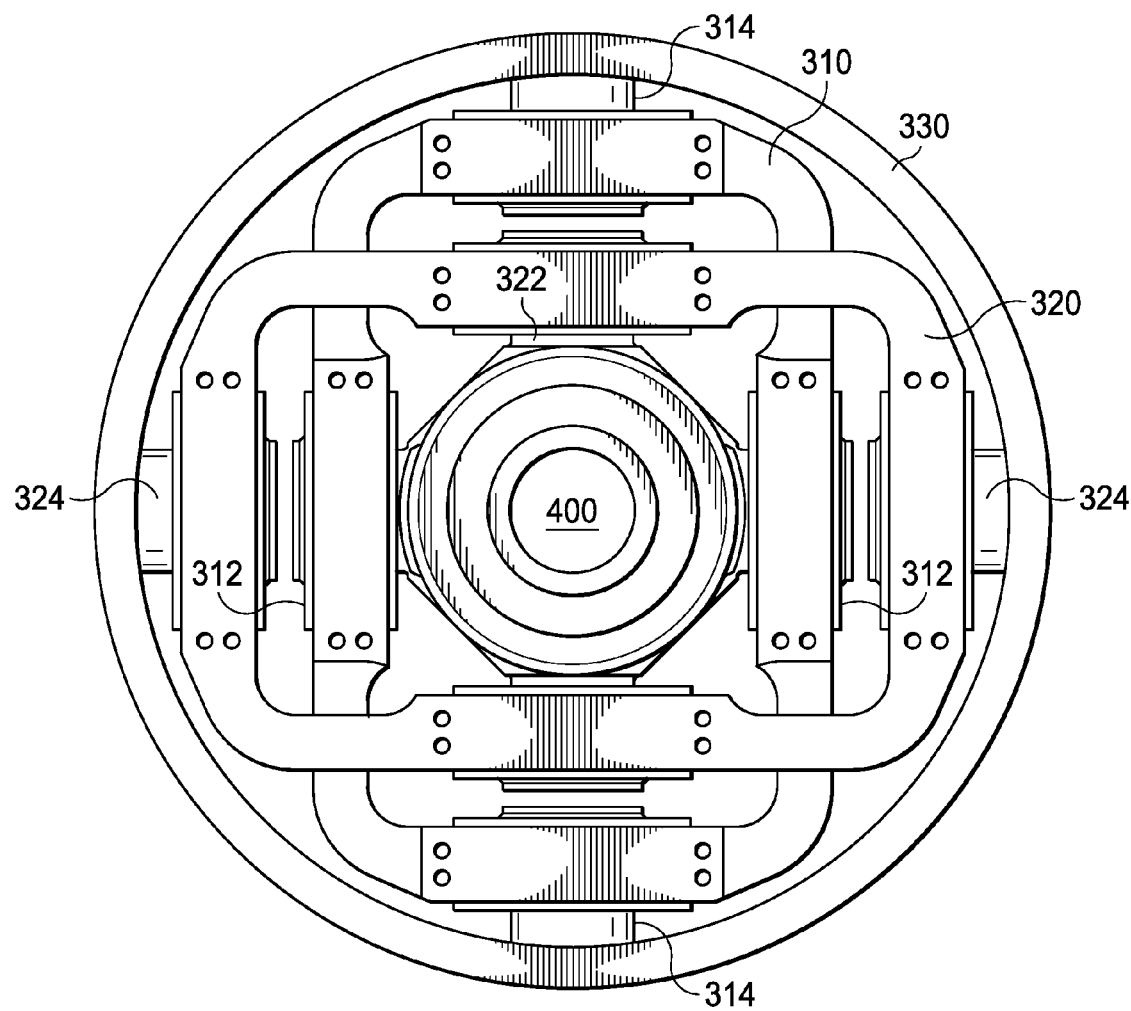
FIG. 5 shows a top view of the joint assembly of FIG. 4.
Figure 6:
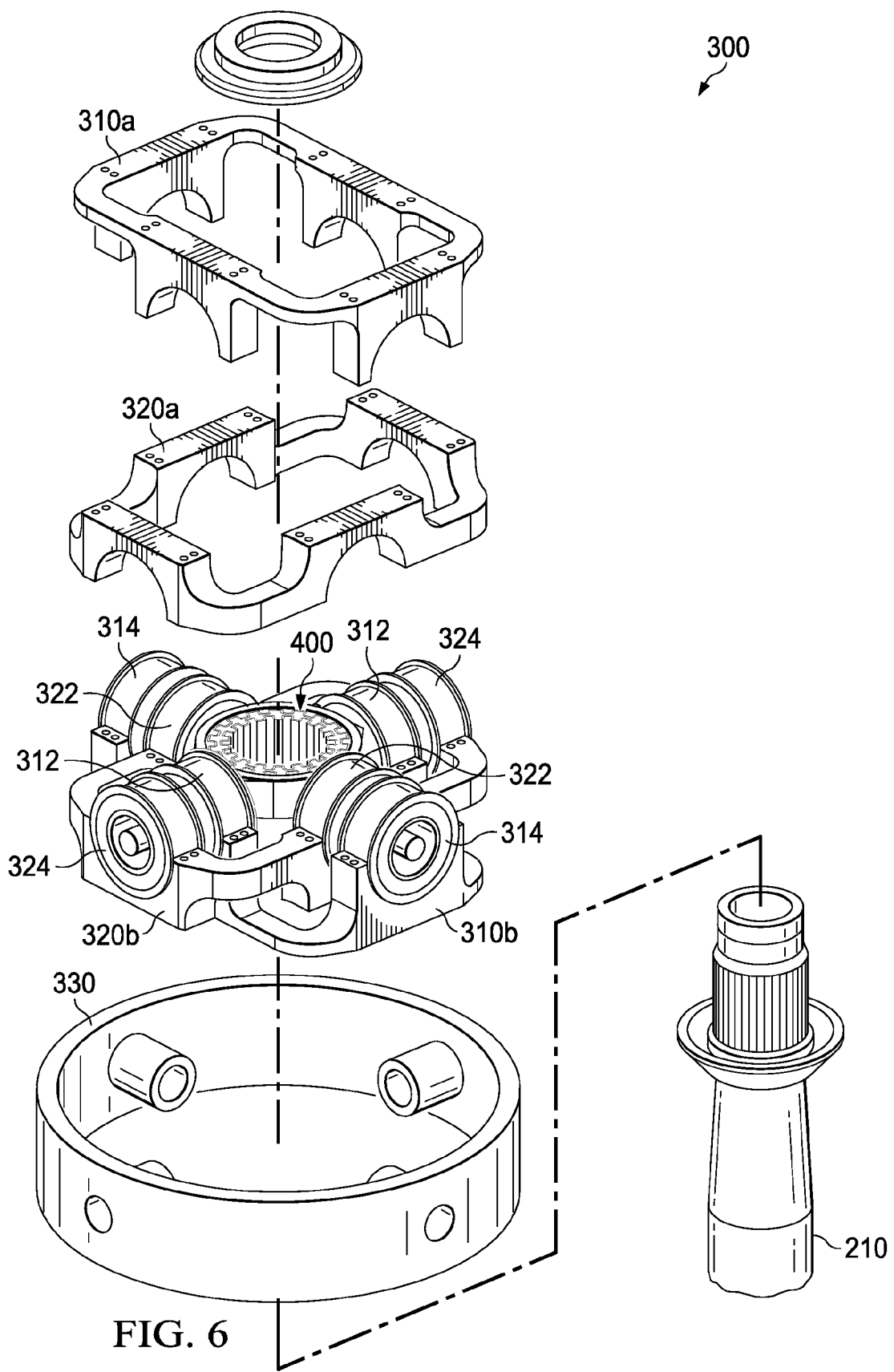
FIG. 6 shows a partially-exploded view of the joint assembly of FIG. 4.

FIG. 4-6 show the joint assembly 300 of FIG. 3 according to one example embodiment. FIG. 4 shows a perspective view of joint assembly 300, FIG. 5 shows a top view of joint assembly 300, and FIG. 6 shows a partially-exploded view of joint assembly 300. In some embodiments, torque may be transferred from rotor mast 210 into torque-splitter assembly 400, as described in greater detail below. For example, torque may then be transferred into a gimbal coupling mechanism of joint assembly 300, which is shown in the example of FIGS. 4-6 as a twin U-joint type CV joint, though other types of couplings may be used.

In the example embodiment of FIGS. 4-6, joint assembly 300 includes two trunion assemblies 310 and 320 and a coupling ring 330. As seen in the example of FIG. 6, drive assembly 310 is formed from upper drive member 310a and lower drive member 310b, and drive assembly 320 is formed from upper drive member 320a and lower drive member 320b. Drive assembly 310 also features opposing inner bearings 312 that are configured to pivotally couple to torque-splitter assembly 400 and opposing outer bearings 314 configured to pivotally couple to coupling ring 330. Similarly, drive assembly 320 features opposing inner bearings 322 that are configured to pivotally couple to torque-splitter assembly 400 and opposing outer bearings 324 configured to pivotally couple to coupling ring 330. In the example of FIGS. 4-6, inner bearings 312 may be located near and coaxial to outer bearings 324, and inner bearings 314 may be located near and coaxial to outer bearings 322.

For each drive assembly 310, 320 of joint assembly 300, torque may be transferred from torque-splitter assembly 400 into drive assemblies 310, 320 through the corresponding pair of opposing inner bearings 312 and 322. Torque may then be transferred from each drive assembly 310, 320 through the corresponding pair of opposing outer bearings 314 and 324 to coupling ring 330. Accordingly, drive assemblies 310 and 320 may be free to rotate relative to each other about an axis passing through each pair of opposing inner bearings 312 and 314. Teachings of certain embodiments recognize that this configuration may allow for gimballing of yoke 220 relative to torque-splitting assembly 400 and rotor mast 210 while providing a constant path for torque from rotor mast 210 to yoke 220. Teachings of certain embodiments also recognize that hub springs may be optional in such a configuration.

Figure 7:
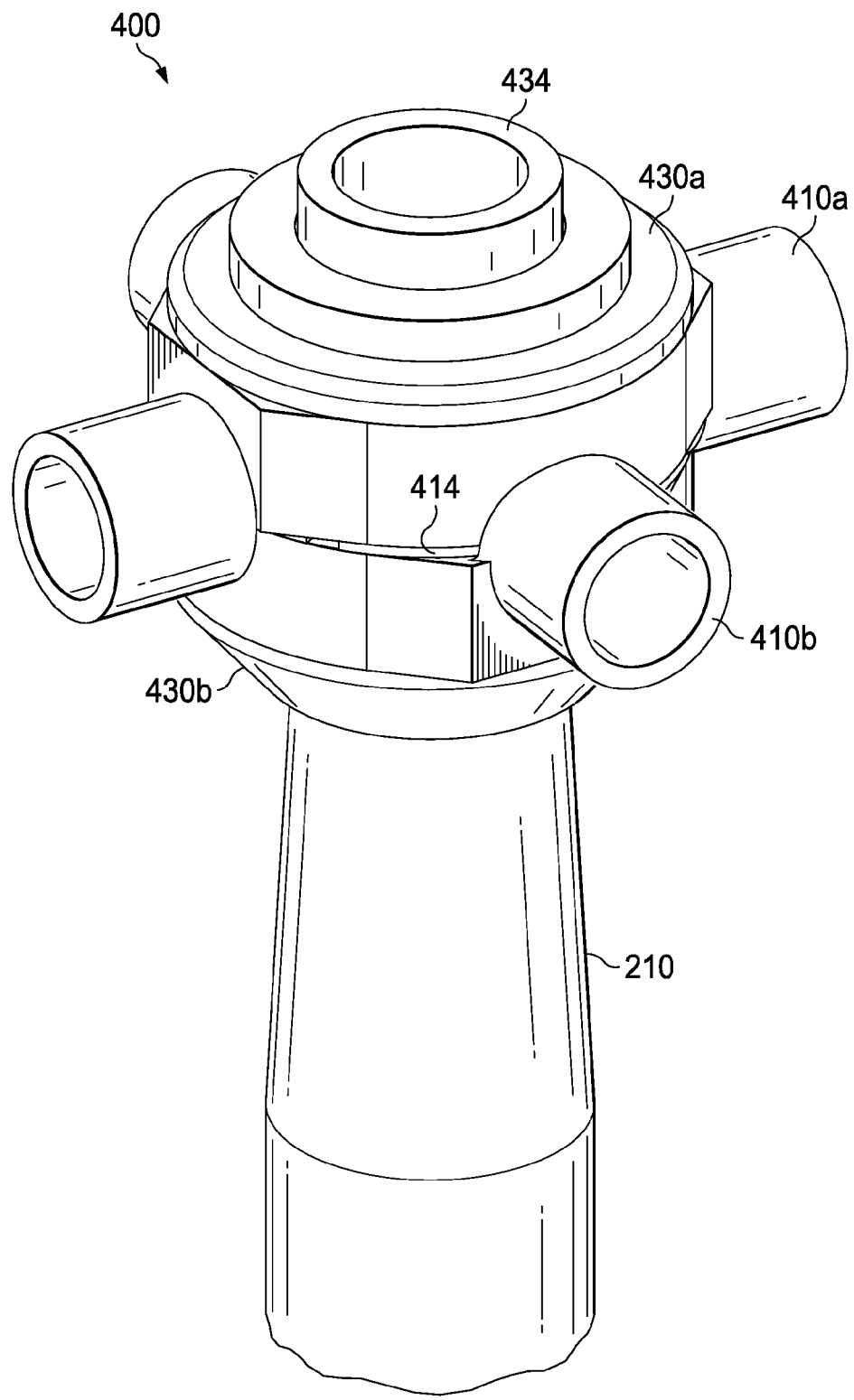
FIG. 7 shows an assembled view of the torque-splitter assembly of the rotor head of FIG. 3.

FIGS. 7-11 show the torque-splitter assembly 400 of FIG. 3 according to one example embodiment. FIG. 7 shows an assembled view of torque-splitter assembly 400, and FIGS. 8-11 show partially-exploded views of torque-splitter assembly 400 in various states of assembly.

In some embodiments, torque-splitter assembly 400 may include trunions 410a and 410b, a spline assembly 420, and retention members 430. In operation, according to one example embodiment, spline assembly 420 is configured to receive rotor mast 210 through a first opening and transmit torque from rotor mast 210 to joint assembly 300 via trunions 410a and 410b. Retention members 430, retention bearings 432a and 432b, and cap 434 may, separately or in combination, prevent certain axial displacement of trunions 410a and 410b.

Figure 8:
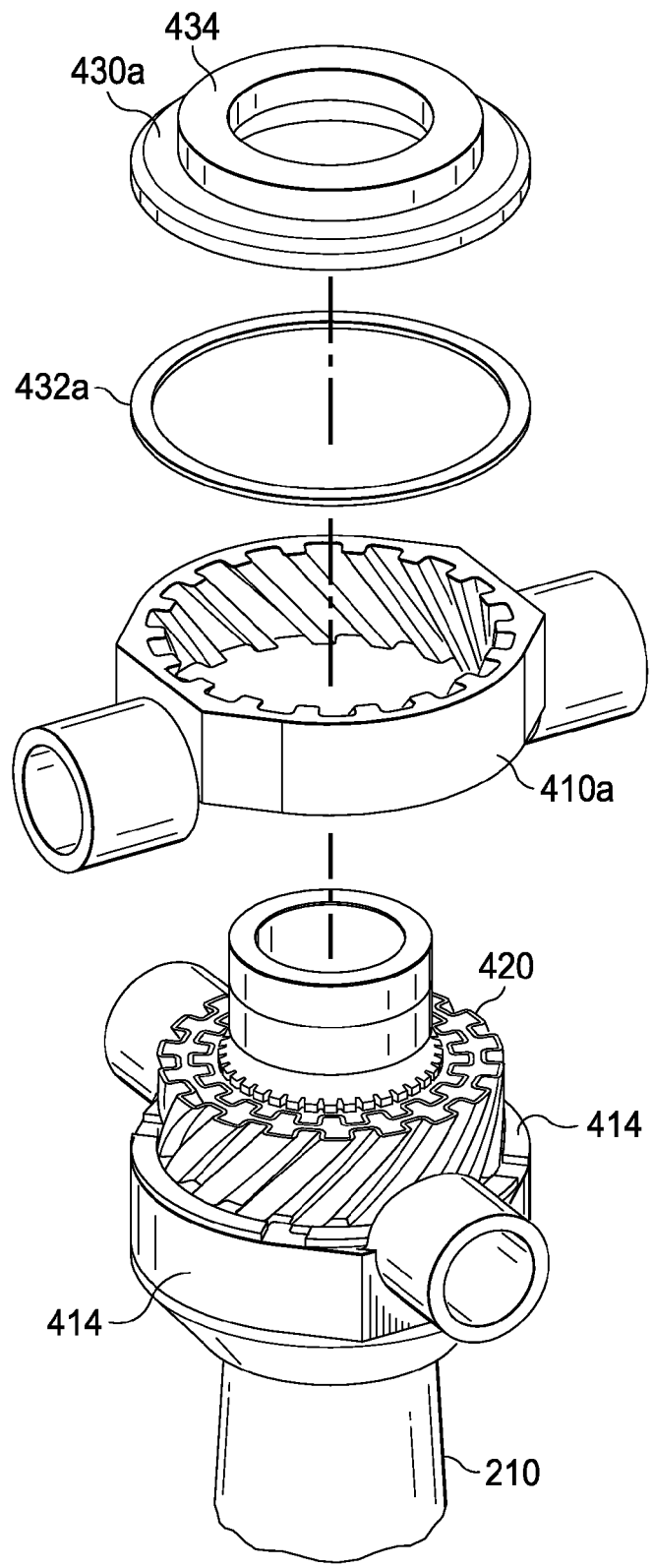
FIGS. 8-11 show partially-exploded views of the torque-splitter assembly of FIG. 7 in various states of assembly.
Figure 9:
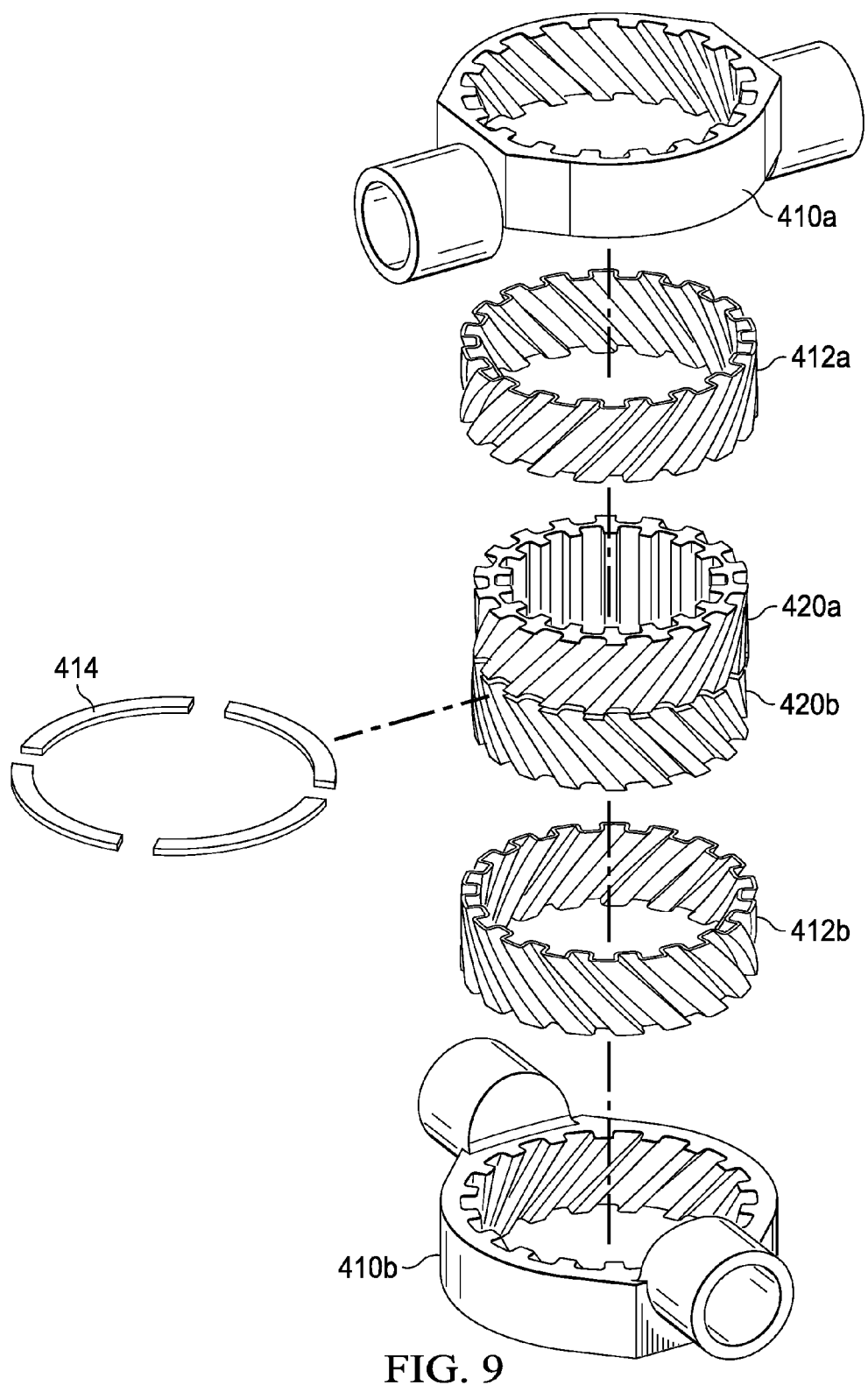
Figure 10:
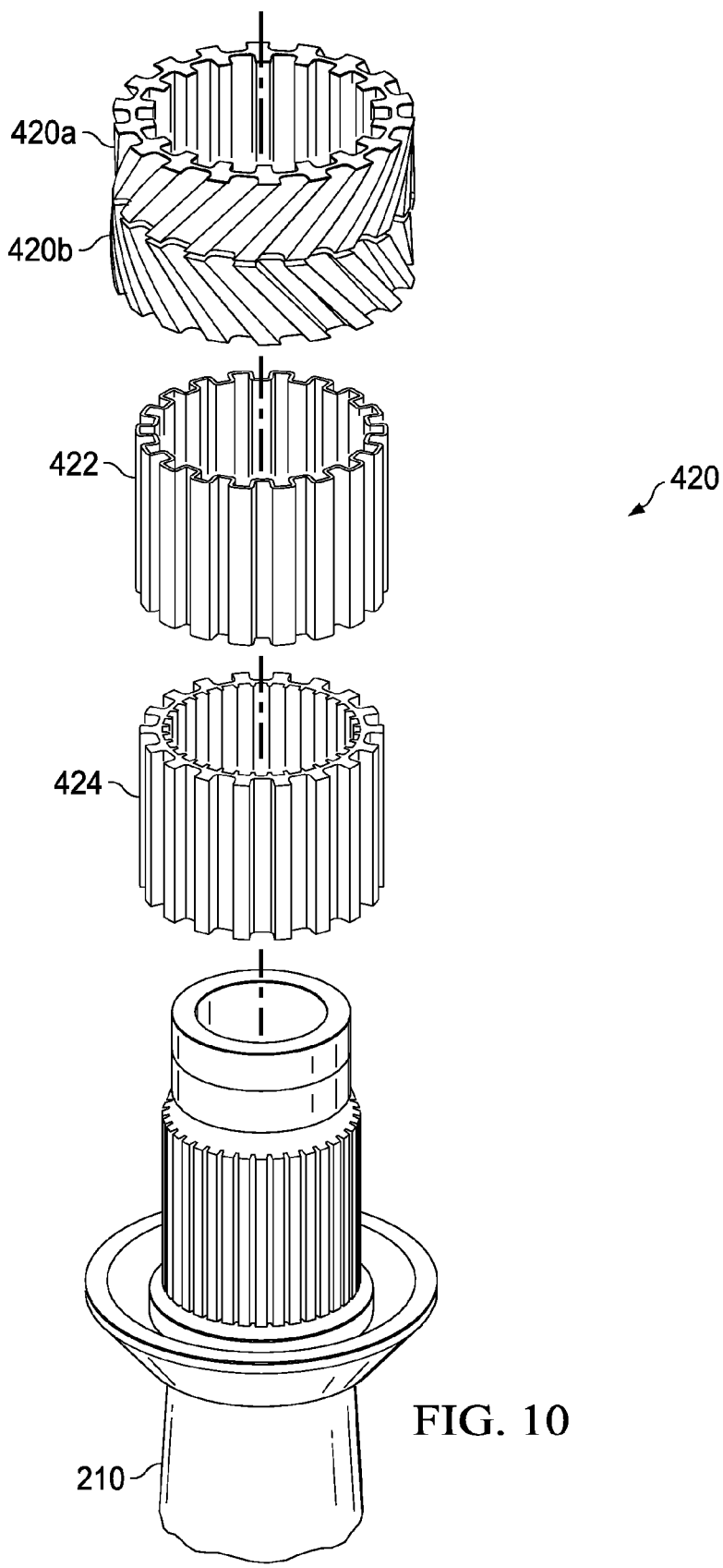

In the example of FIGS. 8-11, spline assembly 420 features outer spline members 420a and 420b and inner spline members 424a and 424b. In some embodiments, some or all of these members may be manufactured as integral components (e.g., a single inner spline member 424, as shown in FIG. 10). A spacer 414 may also be provided that separates trunions 410a and 410b.

Figure 11:
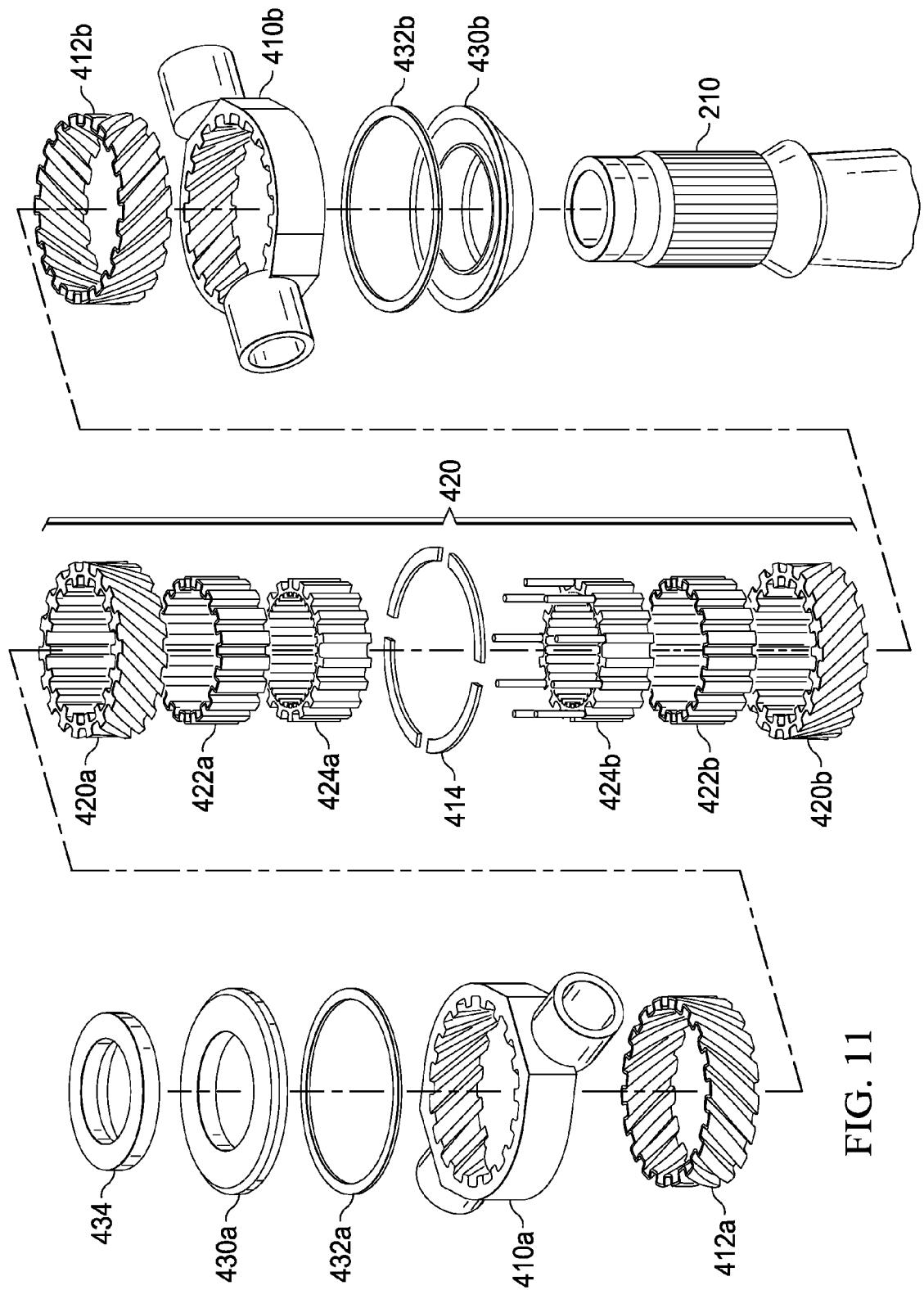

Spline assembly 420 may also include a variety of bearing members, such as trunion bearings 412a and 412b and spline bearings 422a and 422b. In the example of FIG. 11, trunion bearings 412a and 412b separate trunions 410a and 410b from outer spline members 420a and 420b, and spline bearings 422a and 422b separate outer spline members 420a and 420b from inner spline members 424a and 424b. In some example embodiments, trunion bearings 412a and 412b and spline bearings 422a and 422b may be made from an elastomeric material, such as rubber. An elastomeric material is a material, such as a polymer, having the property of viscoelasticity (colloquially, "elasticity"). Elastomeric materials generally have a low Young's modulus and a high yield strain when compared to other materials. Elastomeric materials are typically thermosets having long polymer chains that cross-link during curing (i.e., vulcanizing).

As seen in the examples of FIGS. 10 and 11, inner spline member 424 may feature an inner spline that allows inner spline member 424 to receive torque from rotor mast 210. Inner spline member 424 may also feature an outer spline that allows outer spline members 420a and 420b to move axially relative to inner spline member 424. Outer spline members 420a and 420b may feature inner splines that correspond to the outer spline of inner spline member 424. In some embodiments, outer spline members 420a and 420b may be coupled together such that outer spline members 420*a* and 420*b* move together axially relative to inner spline member 424.

Outer spline members 420*a* and 420*b* may also feature outer splines oriented in different directions. For example, outer spline member 420*a* may feature a helical spline oriented at a first direction, and outer spline member 420*b* may feature an outer spline oriented at a second direction different from the first direction (e.g., opposite of the first direction), such as shown in FIGS. 10 and 11.

In operation, according to one example embodiment, the straight elastomeric spline inside inner spline member 424 may receive torque through a mating portion of rotor mast 210 and transmit the torque to the inner splines of outer spline members 420*a* and 420*b*. The opposite helical elastomeric outer splines of outer spline members 420*a* and 420*b* may provide equal torque to the two trunions 410*a* and 410*b*.

Teachings of certain embodiments recognize that spline assembly 420 may allow trunions 410*a* and 410*b* to transmit equal drive torque while moving relative to each other in a kinematic scissoring motion, which may eliminate some kinematic binding forces. For example, trunions 410*a* and 410*b* may scissor relative to each other in response to kinematic error from flapping of the rotor hub. In some embodiments, torque-splitting assembly 400 may allow trunions 410*a* and 410*b* to scissor relative to each other by allowing outer spline members 420*a* and 420*b* to move axially in a direction that allows trunions 410*a* and 410*b* to scissor on opposing helical splines. For example, when one trunion begins to lead or lag, an unbalanced axial load in the helical splines may cause displacement of outer spline members 420*a* and 420*b* relative to inner spline member 420 such that equilibrium is restored and the torque is balanced. Although retention members 430*a* and 430*b* may prevent axial movement of trunions 410*a* and 410*b*, outer spline members 420*a* and 420*b* may be free to move axially without being limited by retention members 430*a* and 430*b*.

Although the examples of FIGS. 8-10 show splines comprised of mating grooves, teachings of certain embodiments recognize that a variety of splines may be used. For example, in some embodiments, some splines could be made of rollers, balls, or bearings that allow for motion to be controlled in certain directions as desired.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. A rotorcraft, comprising:
   a body;
   a power train coupled to the body and comprising a power source and a drive shaft in mechanical communication with the power source;
   a rotor blade; and
   a rotor head coupling the rotor blade to the power source, the rotor head comprising:
      a yoke disposed about the drive shaft and coupled to the rotor blade;
      a torque-splitter assembly comprising:
         a spline assembly configured to receive the drive shaft through a first opening, the spline assembly having a first plurality of outer splines oriented in a first direction and a second plurality of outer splines oriented in a second direction different from the first direction;
         a first trunion disposed about the first plurality of outer splines; and
         a second trunion disposed about the second plurality of outer splines; and
      a joint assembly coupling the first and second trunions to the yoke.

2. The rotorcraft of claim 1, wherein the joint assembly is operable to achieve a substantially constant velocity (CV) characteristic between the drive shaft and the yoke.

3. The rotorcraft of claim 1, wherein the spline assembly is configured to move axially relative to the drive shaft.

4. The rotorcraft of claim 1, the first trunion configured to move relative to the spline assembly in the first direction.

5. The rotorcraft of claim 1, wherein the first plurality of outer splines are arranged helically about the spline assembly.

6. The rotorcraft of claim 1, the spline assembly comprising an outer spline member having a plurality of inner splines arranged axially on an inner portion of the outer spline member and having the first plurality of outer splines arranged on an outer portion of the outer spline member.

7. The rotorcraft of claim 6, wherein the outer spline member is configured to move axially relative to the drive shaft along the plurality of inner splines.

8. The rotorcraft of claim 6, the spline assembly further comprising an inner spline member disposed at least partially within the outer spline member, the inner spline member having a plurality of outer splines corresponding to the plurality of inner splines of the outer spline member.

9. The rotorcraft of claim 8, further comprising a bearing material disposed between the inner spline member and the outer spline member.

10. The rotorcraft of claim 1, the spline assembly comprising:
    a first outer spline member having the first plurality of outer splines; and
    a second outer spline member having the second plurality of outer splines.

11. The rotorcraft of claim 10, wherein the first outer spline member is coupled to the second outer spline member.

12. A torque-splitter assembly, comprising:
    a spline assembly configured to receive a drive shaft through a first opening, the spline assembly having a first plurality of outer splines oriented in a first direction and a second plurality of outer splines oriented in a second direction different from the first direction;
    a first trunion disposed about the first plurality of outer splines; and
    a second trunion disposed about the second plurality of outer splines.

13. The torque-splitter assembly of claim 12, wherein the spline assembly is configured to move axially relative to the drive shaft.

14. The torque-splitter assembly of claim 12, the first trunion configured to move relative to the spline assembly in the first direction.

15. The torque-splitter assembly of claim 12, wherein the first plurality of outer splines are arranged helically about the spline assembly.

16. The torque-splitter assembly of claim 12, the spline assembly comprising:
   a first outer spline member having the first plurality of outer splines; and
   a second outer spline member having the second plurality of outer splines.

17. The torque-splitter assembly of claim 12, the spline assembly comprising an outer spline member having a plurality of inner splines arranged axially on an inner portion of the outer spline member and having the first plurality of outer splines arranged on an outer portion of the outer spline member.

18. The torque-splitter assembly of claim 17, wherein the outer spline member is configured to move axially relative to the drive shaft along the plurality of inner splines.

19. The torque-splitter assembly of claim 17, the spline assembly further comprising an inner spline member disposed at least partially within the outer spline member, the inner spline member having a plurality of outer splines corresponding to the plurality of inner splines of the outer spline member.

20. The torque-splitter assembly of claim 19, further comprising a bearing material disposed between the inner spline member and the outer spline member.

\* \* \* \* \*